Sept. 23, 1969    J. T. KUMMER    3,468,709
SECONDARY BATTERY EMPLOYING AN ELECTRONICALLY-INSULATIVE
CATIONICALLY-CONDUCTIVE SOLID ELECTROLYTE
WITH ANODIC AND CATHODIC FEEDER MEANS
Filed April 3, 1967    3 Sheets-Sheet 1

JOSEPH T. KUMMER
INVENTOR.

BY John R. Faulkner
Olin B. Johnson

ATTORNEYS

JOSEPH T. KUMMER
INVENTOR.

BY John R. Faulkner
Olin B. Johnson

ATTORNEYS

JOSEPH T. KUMMER
INVENTOR.

BY John R. Faulkner
Olin B. Johnson

ATTORNEYS

United States Patent Office 3,468,709
Patented Sept. 23, 1969

3,468,709
SECONDARY BATTERY EMPLOYING AN ELECTRONICALLY - INSULATIVE, CATIONICALLY-CONDUCTIVE SOLID ELECTROLYTE WITH ANODIC AND CATHODIC FEEDER MEANS
Joseph T. Kummer, Ann Arbor, Mich., assignor to Ford Motor Company, Dearborn, Mich., a corporation of Delaware
Filed Apr. 3, 1967, Ser. No. 628,025
Int. Cl. H01m 35/00, 9/00
U.S. Cl. 136—6                                              23 Claims

ABSTRACT OF THE DISCLOSURE

An electrically-rechargeable, secondary battery comprising cells in series electrical connection, a unit cell of said battery comprising a closeable cell housing which when closed forms an internal compartment and has oppositely disposed, electronically-conductive, wall surfaces electronically insulated from each other which respectively serve as anode and cathode of the cell, an electronically-insulative, cationically-conductive, solid electrolyte interposed between said anode and said cathode, dividing said compartment into an anodic reaction zone and a cathodic reaction zone, and separating the anodic half-cell reactions of said anodic reaction zone from the cathodic half-cell reactions of said cathodic reaction zone, an anodic reactant feeder means comprising a porous object positioned within said anode compartment and in contact with said electrolyte, a cathodic reactant feeder means comprising a porous object positioned within said cathodic reaction zone and in contact with said solid electrolyte, an alkali metal within said anodic reaction compartment in contact with said anodic reactant feeder means and said solid electrolyte and in electrical connection with said anode, and within said cathodic reaction zone in contact with said cathodic reactant feeder means and said solid electrolyte and in electrical connection with said cathode, a sulfur-comprising cathodic reactant-electrolyte that is electrochemically reversibly reactive with ions of said alkali metal; and the aforedescribed cell.

---

This invention relates to high energy density batteries which employ a molten alkali metal as the anodic reactant and to their construction and operation. In particular, this invention is concerned with improvements in batteries the cell or cells of which employ a molten alkali metal anodic reactant and a sulfur-comprising cathodic reactant-electrolyte that is electrochemically reversibly reactive with cations of the alkali metal. Batteries and/or cells of this type are described in my copending United States patent applications, Ser. Nos. 507,624, 563,938 and 582,608, the disclosures of which are incorporated herein by reference.

This type of cell is separated into an anodic reaction zone and a cathodic reaction zone by a solid electrolyte, preferably a crystalline object or membrane that is selectively conductive to cations of the alkali metal anode-reactant and essentially impermeable to other contents of these zones, e.g. the anodic reactant in elemental form, anions of the cathodic reactant and the cathodic reactant in elemental or compound form. Suitable solid electrolytes for use in the instant invention, their properties and preparation are described in detail in the aforementioned patent applications.

In the discharge half cycle of the cell, the alkali metal anodic reactant, e.g. molten sodium, releases electrons to the anode and thence to the external circuit with resultant formation of cations in the anodic reaction compartment. Sulfur atoms in the cathodic reaction zone accept electrons from the cathode and external circuit forming anions. The positively charged alkali metal ions are attracted to the cathodic reaction zone and pass through the cationically-conductive solid electrolyte to associate with the negatively charged sulfur ions. In the charging half cycle, the current flow is reversed by applying an extraneous source of electrical energy and the alkali metal ions are driven back through the solid electrolyte into the anodic reaction zone.

This invention relates to improvements in batteries and/or cells of the type hereinbefore described which have as their objectives minimizing internal impedance in such cells and increasing their power output capacity per unit volume.

This invention will be more fully understood by a study of the accompanying drawings in conjunction with the following detailed description:

Figure 1:
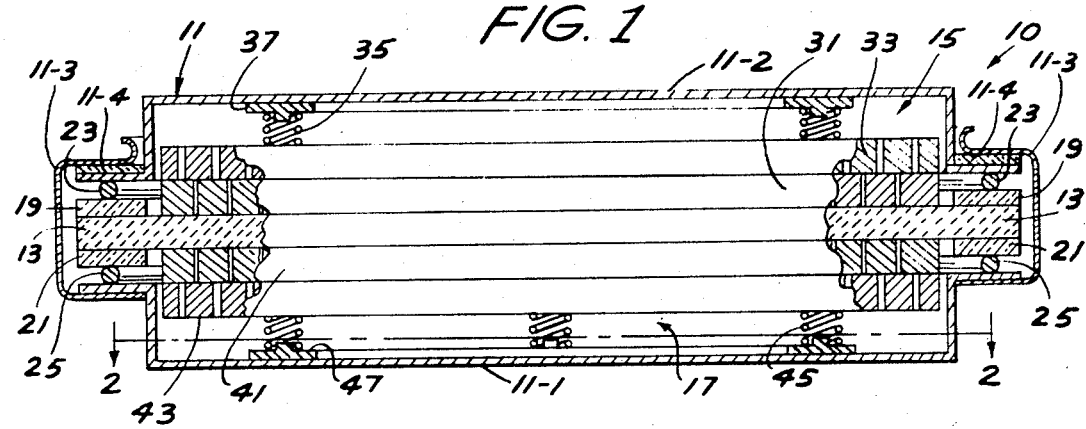
FIGURE 1 is a sectional view of one embodiment of a cell constructed in accordance with this invention.
Figure 2:
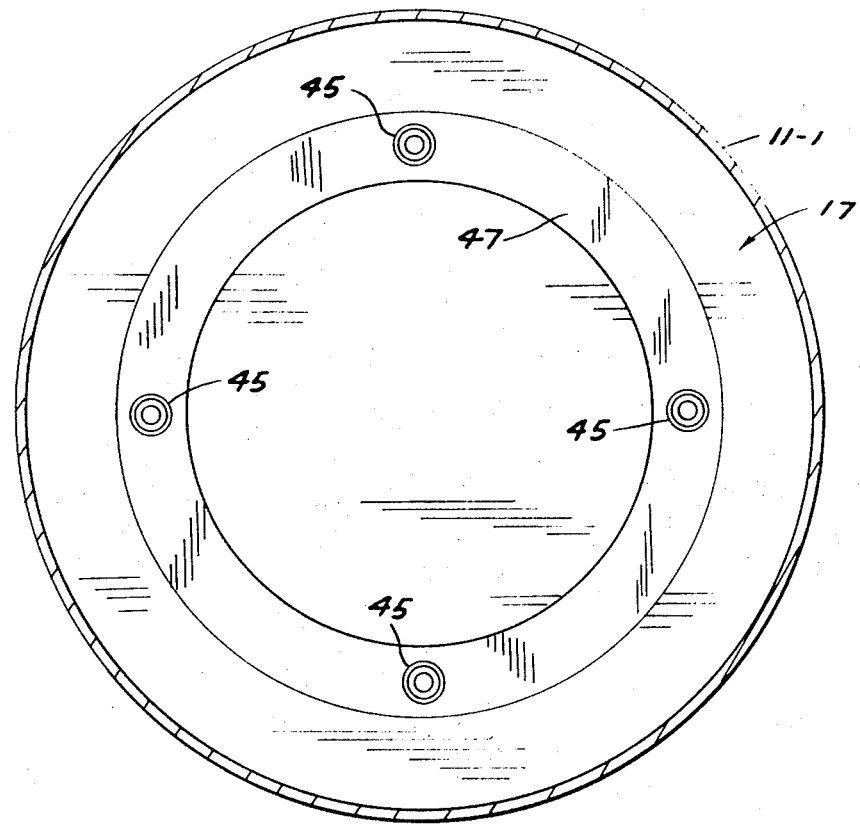
FIGURE 2 is a view taken along line 2—2 of FIGURE 1.

Referring now to FIGURES 1 and 2, there is shown a cell 10 having a cell container 11. Cell container 11 comprises a cup-like lower member 11–1, a cup-like upper member 11–2, clamping means 11–3, and insulator ring 11–4.

Cell container 11 should be formed of one or more metals or alloys that are good electrical conductors, chemically resistant to the reactants and reaction products making contact therewith, and have a coefficient of expansion essentially equal to that of the ceramic half-cell separator hereinafter described, e.g. about $60 \times 10^{-7}$ unit change/unit length/° C. While a suitable metal carbide, nitride or phosphide or combination thereof may be used, in this embodiment, lower member 11–1 and upper member 11–2 are formed from an iron-nickel alloy containing about 41% nickel with the interiors thereof coated with aluminum. The exterior bottom surface of member 11–1 and the exterior top surface of member 11–2 are coated with silver to provide good electrical connection between cells stacked vertically in series connection. Suitable alloys for the manufacture of lower member 11–1 and upper member 11–2 are well known in the art. See, for example, Low Expansion Alloys by M. A. Hunter, Metal Handbook, 8th edition, vol. 1, Properties and Selection of Metals, pp. 816–818, American Society of Metals, Metals Park, Ohio, 1961.

Clamping means 11–3 is formed of spring steel and welded or otherwise secured to lower member 11–1. While one type of clamping means is here illustrated, it will be understood by those skilled in the art that a wide variety of clamping means can be used for this purpose.

Insulator ring 11–4 in this embodiment is glass. It may be alpha-alumina or other suitable insulator.

Plate member 13, a cationically-conductive, polycrystalline solid electrolyte, divides the interior of container 11 into an anodic reaction zone 15 and a cathodic reaction zone 17. Plate 13 is essentially electronically nonconductive.

Plate 13 may be a polycrystalline object formed by sintering crystals consisting essentially of a structural lattice and sodium ions which are mobile in relation to such lattice under influence of an electric field. The structural lattice consists essentially of a major proportion by weight of ions of aluminum and oxygen and a minor proportion by weight of a metal having a valence not greater than 2 in crystal lattice combination, e.g. lithium or magnesium. In this embodiment, plate 13 is prepared in the following manner.

(1) In powdered form $Na_2CO_3$, $LiNO_3$, and $Al_2O_3$ were added to a vessel and mechanically mixed for 30 minutes. The $Al_2O_3$ employed was in the form of 0.05 micron particles (Linde B). The weight percent of the individual oxides employed were $Li_2O$—0.99, $Na_2O$—9.99 and $Al_2O_3$—89.02.

(2) The mix was heated at 1250° C. for one hour.

(3) The sample was mixed with a wax binder (Carbowax) and mechanically pressed into flat plates.

(4) The plates were then isostatically pressed at 90,000 p.s.i.

(5) The wax binder was removed by slowly heating the plates to about 550° C.

(6) The plates were sintered in an electric furnace at 1460° C. During sintering, the plates were kept in a covered crucible in the presence of packing powder of the same composition as said mix.

In this embodiment, solid electrolyte 13 is a circular plate which is held in place between lower member 11–1 and upper member 11–2 by insulation rings 19 and 21 and O rings 23 and 25. Insulating rings 19 and 21 are of alpha-alumina, $Al_2O_3$, but glass rings may also be used. These rings should be impervious to gases and liquids and have a coefficient of expansion essentially the same as that of plate 13. These rings can be sealed to the ceramic plate 13 by a sealing glass that is resistant to the alkali metal used or by means of grinding to a roughness less than about $10^{-5}$ inch and lapping. In this embodiment, the seal between the container 11 and these insulating rings is made by an aluminum plated stainless steel O ring. One may also use other gasketing materials which are resistant to temperatures of at least about 300° C. and to chemical attack by the reactants contacted, e.g. boron nitride.

Positioned in contact with and immediately above plate 13 in anoidic reaction zone 15 is a porous metal plate 31. Advantageously a substantial portion of the pores in plate 31 are of a size within the capillary range. In this embodiment, plate 31 is steel and has an average pore diameter of about 20–30 microns. Immediately above and in contact with plate 31 is a second porous steel plate or grid 33 having a substantially larger average pore diameter, advantageously at least twice as large as the average pore diameter of plate 31. In this embodiment, a substantial number of the pores of plate 33 have an average pore diameter in the range of about 100–200 microns.

Plates 31 and 33 should be of a material that is resistant to attack by the molten alkali metal used as the anode-reactant and a material that is wetted by this alkali metal. These plates serve as feeder means providing an even distribution of the alkali metal to the surface of plate 13 facing zone 15. They also serve as safety means by preventing a too rapid mixing of the alkali metal with the sulfur-comprising, cathodic reactant- electrolyte in the event plate 13 is broken in use. Porous metal plates are well known in the art and can be prepared with a wide range of porosity characteristics. See, for example, Porous Powder Metallurgical Products, R. Bishop and G. M. Collins, in Chemical Engineering Practice, vol. 2 at pp. 464–482, 1956, Academic Press, N.Y., and Forms and Properties of Porous Metal Products, H. Mourven and T. R. Fruda in Progress in Powder Metallurgy, vol. 18 at pp. 166–171, 1962, Capitol City Press, Montpelier, Vt.

Anodic reaction zone 15 is filled with molten sodium to a height above the upper surface of plate 33. Plates 31 and 33 are held in position against plate 13 by springs 35. Springs 35 are affixed to metal ring 37 which in turn is welded to upper member 11–2.

Positioned immediately below plate 13 is porous plate 41 and immediately below that plate 43. Plate 41 has substantially smaller pores than plate 43 in the manner of plates 31 and 33. Plates 41 and 43 are preferably formed of an electrically-conductive material. In this embodiment, plates 41 and 43 are porous carbon plates having pores averaging about 20 to 30 microns and about 100 to 200 microns respectively. Porous carbon plates having a wide variety of pore sizes are commercially available. Such plates are prepared by a variety of methods, e.g. admixing finely divided carbon with an organic binder, compressing the mix into the desired shape under high pressures and heating the resultant compressate in a controlled atmosphere such as carbon dioxide until the desired porosity is obtained. In certain embodiments, it may be advantageous to reinforce the carbon plates or to prepare them in sections with flexible or resilient separators interposed therebetween. Plates 41 and 43 should be of a material that is readily wetted by the sulfur or sulfur-comprising reactant which partially fills the cathodic reaction zone 17 contacting the lowermost plate and thence rising through the pores of the two plates to contact the ceramic plate 13. These plates serve as feeder means in distributing an even supply of sulfur to the surface of plate 13 facing into zone 17. In conjunction with plates 31 and 33, these plates serve to prevent rapid mixing of reactants if plate 13 is broken. Cathodic reaction zone 17 contains sulfur or a sodium and sulfur-comprising oxidant, e.g. $Na_2S_5$.

The sulfur-comprising cathodic reactant may contain finely divided carbon to provide conduction until sodium ions have migrated through plate 13. Plates 41 and 43 are held in position against plate 13 by springs 45. Springs 45 are affixed to metal ring 47 which in turn is welded to the lower member 11–1. Ring 37 and ring 47 in this embodiment are Chromel. When an aluminum lining is employed within lower member 11–1, contact between the aluminum and the sulfur-comprising cathodic reactant-electrolyte tends to reduce electrical conduction between the iron-nickel alloy body of lower member 11–1 and springs 45. Hence, Chromel ring 47, or a ring of other suitable metal or alloy, is employed to facilitate electrical connection between lower member 11–1 and its contents. Ring 37 is here used in the same manner even though the anodic reactant is of different composition.

Figure 3:
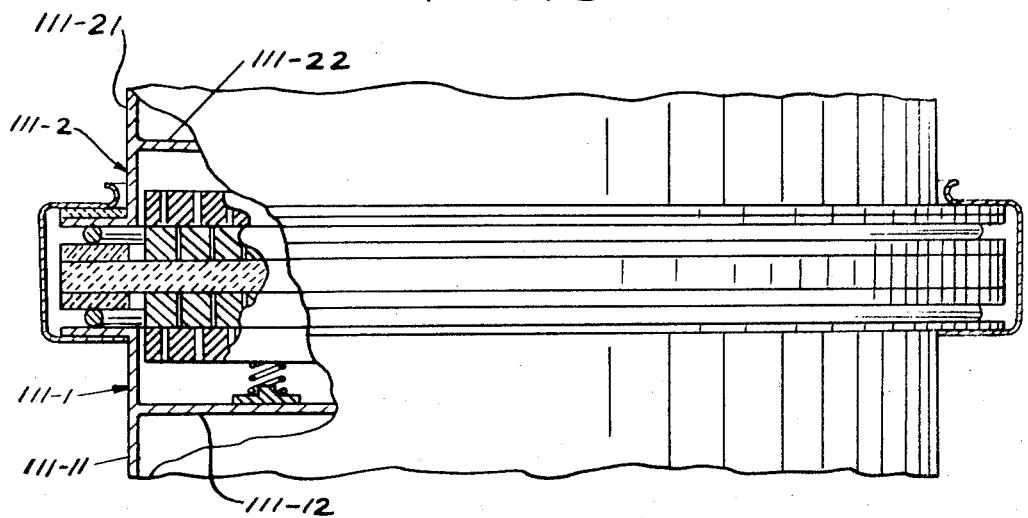
FIGURE 3 is a partially cut-away view in side elevation of another embodiment of a cell of this invention.

Referring now to FIGURE 3, it will be seen that the cell construction in this embodiment is identical with that of the embodiment shown in FIGURE 1 with the exception of container member 111–1 and container member 111–2. In this embodiment, both member 111–1 and member 111–2 have side walls 111–11 and 111–21 respectively. By extending walls 111–11 and 111–21 beyond the cell boundaries, they may be utilized as sidewalls for adjacent half-cells of the adjacent cells. Thus, circular member 111–12 becomes the bottom of the cell illustrated and the top of the cell to be formed in identical manner immediately below the illustrated cell. Likewise, circular member 111–22 serves as the top of the illustrated cell and as the bottom of the cell to be constructed in identical manner immediately above the illustrated cell. This construction has the advantage of providing series connection between adjacent cells with a single metal sheet. This avoids problems of providing even contact between adjacent cells and reduces the thickness requirements for the intervening metal.

Figure 4:
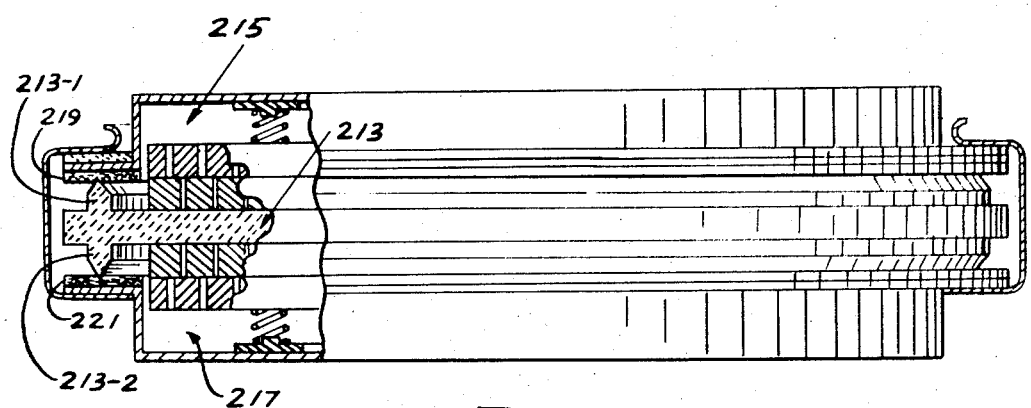
FIGURE 4 is a partially cut-away view in side elevation of still another embodiment of a cell of this invention.

Referring now to FIGURE 4, it will be seen that the cell construction in this embodiment is identical with the embodiment shown in FIGURE 1 with the exception of ceramic plate 213 and its separation from the cell container via gaskets 219 and 221.

Plate 213 divides the interior of the cell into an anodic reaction zone 215 and a cathodic reaction zone 217 and in this embodiment has a substantially peripheral upper flange 213–1 and a substantially peripheral lower flange 213–2. Plate 213 is formed by admixing crystals of sodium beta-alumina, $Na_2O \cdot 11Al_2O_3$, with an organic binder, compressing the admixture under extremely high pressures, and sintering the resultant compressate. Flanges 213-1 and 213-2 are integrally formed with plate 213 with an appropriately shaped mold prior to sintering.

Gaskets 219 and 221 are impermeable to liquids and gases and are resistant to sodium and sulfur. In this embodiment, gaskets 219 and 221 are formed of boron nitride. They may also be any siutable refractory material that has a coefficient of expansion close to that of plate 213.

Figure 5:
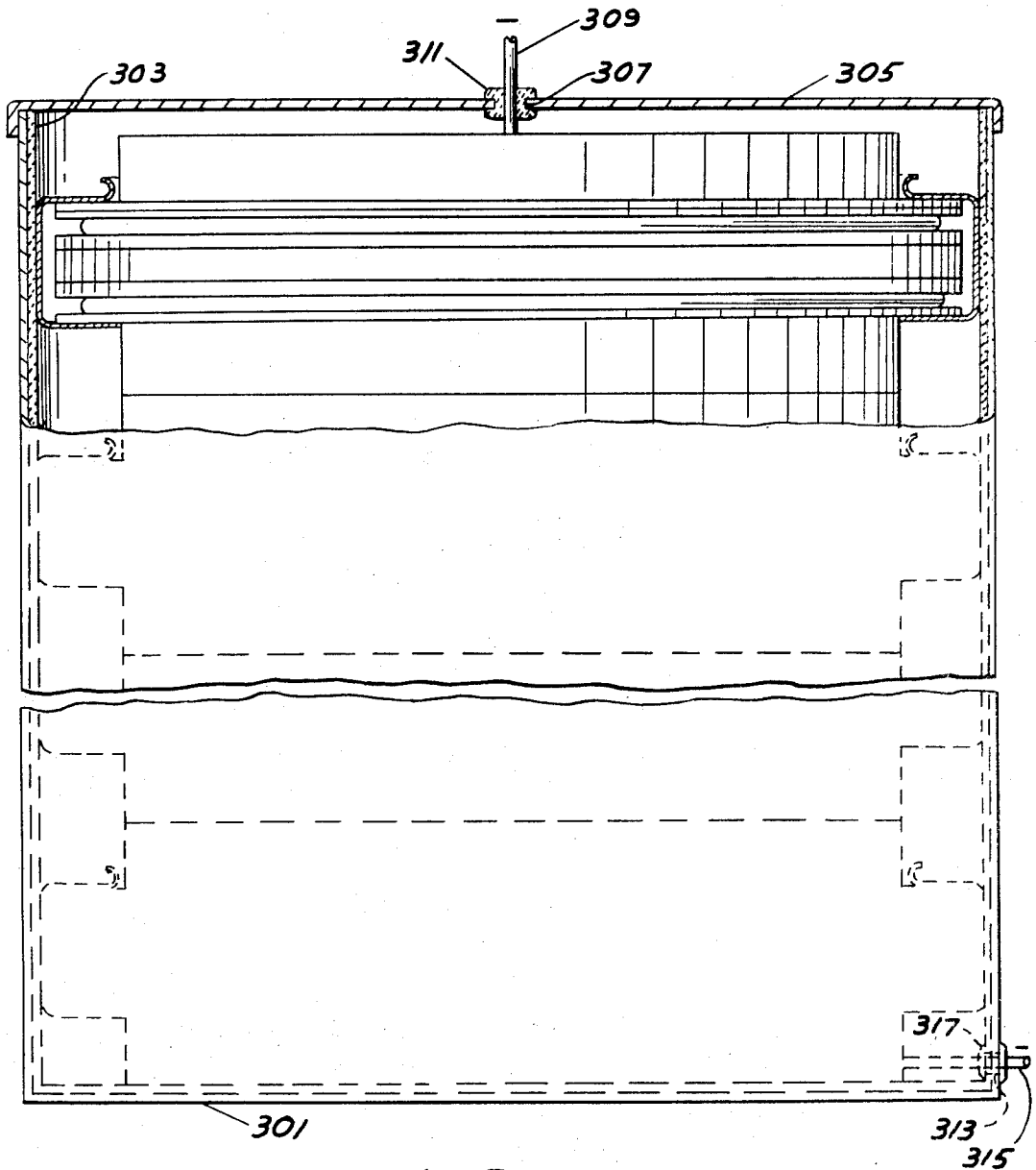
FIGURE 5 is a partially cut-away view in side elevation of one embodiment of a battery of this invention comprising a plurality of cells in series electrical connection.

Referring now to FIGURE 5, there is shown a plurality of cells vertically stacked in series electrical connection within a cylindrical container 301. Container 301 has a liner 303 formed of a suitable nonconductor, e.g. mica, glass, vitreous material, etc., and a cover 305.

Through an aperture 307 in cover 305, electrical connection is provided between the top surface, the anode, of the upper cell and an external circuit via conductor 309. Conductor 309 is resiliently supported in aperture 307 by a nonconductive stopper or sleeve 311, e.g. glass, mica, or a glass or mica centrally lined spring-comprising metal sleeve.

Container 301 has an aperture 313 through which electrical connection is provided between the lower surface, the cathode, of the bottom cell and said electrical circuit via conductor 315. Conductor 315 is resiliently supported in aperture 313 by a nonconductive stopper or sleeve 317.

It will be understood by those skilled in the art that two or more of such batteries of cells as shown in FIGURE 5 may be connected in series and/or parallel to provide the desired output of electrical energy.

This cell can be assembled at room temperature by placing the sulfur-comprising cathodic reactant in the cuplike lower member, assembling the plates, insulator rings, gaskets and/or O rings upon the lower member, securing the externally mounted insulator ring upon the cup-like upper member and placing the alkali metal therein, bringing the lower member and upper member together and snapping the spring-like clamping means into clamping position. The cell may then be heated to operating temperature, a temperature at least sufficient to maintain both the anodic reactant and the cathodic reactant in molten state. As heating means do not comprise a part of this invention, no specific heating means is shown herein. However, it will be understood by those skilled in the art that either external or internal heating means may be used. If internal heating means are employed, suitably sealed inlet and outlet means can be provided in the cell housing. It will also be understood that the cell, the retaining unit for a plurality of cells, or both, may be designed to provide for internal or external cooling.

If the cell is assembled in an oxygen atmosphere, the entrapped gaseous oxygen will react with the alkali metal forming an oxide thereof and with the sulfur forming a thiosulfite thereof after the discharge cycle is initiated thereby creating a partial vacuum in the sealed cell. This helps to avoid undue expansion upon further heating.

It is is to be understood that this invention is not limited to the examples herein shown and described but that changes and modifications may be made within the spirit and scope of the invention as defined in the appended claims.

I claim:
1. An electrically rechargeable cell for generating electrical energy electrochemically comprising a closeable cell housing which when closed forms an internal compartment and has oppositely disposed, electronically-conductive, wall surfaces which are electronically insulated from each other and serve as the anode and cathode of said cell, an electronically-insulative, cationically-conductive, solid electrolyte interposed between said anode and said cathode dividing said compartment into an anodic reaction zone extending between said solid electrolyte and said anode and a cathodic reaction zone extending between said solid electrolyte and said cathode and separating the anodic half-cell reactions of said anodic reaction zone from the cathodic half-cell reactions of said cathodic reaction zone, a first anodic reactant feeder means positioned within said anodic reaction zone in contact with said solid electrolyte and comprising a porous object having a first average pore diameter, a second anodic reactant feeder means position within said anodic reaction zone in contact with said first anodic reactant feeder means and comprising a porous object having a second average pore diameter, said second average pore diameter being substantially larger than said first average pore diameter, a cathodic reactant feeder means comprising a porous object, positioned within said cathodic reaction zone, and in contact with said solid electrolyte, an alkali metal within said anodic reaction zone, in contact with said first anodic reactant feeder means, said second anodic reactant feeder means, and said solid electrolyte, and in electrical connection with said anode, and within said cathodic reaction zone in contact with said cathodic reactant feeder means and said solid electrolyte and in electrical connection with said cathode, a sulfur-comprising cathodic reactant-electrolyte that is electrochemically reversibly reactive with ions of said alkali metal, said solid electrolyte being selectively conductvie to ions of said alkali metal and essentially impermeable to all other contents of said anodic reaction zone and said cathodic reaction zone.

2. A cell in accordance with claim 1 wherein said first anodic reactant feeder means is electronically conductive and has a substantial number of pores in the capillary range.

3. A cell in accordance with claim 1 wherein said first anodic reactant feeder means is electronically conductive and has an average pore diameter of about 20 to about 30 microns.

4. A cell in accordance with claim 1 wherein said first anodic reactant feeder means is a metal plate having major surfaces oppositely disposed that are essentially planar and in parallel relationship with the nearest surface of said solid electrolyte.

5. A cell in accordance with claim 1 wherein said second anodic reactant feeder means is electronically conductive and has an average pore diameter at least twice as large as said first average pore diameter.

6. A cell in accordance with claim 1 wherein said second anodic reactant feeder means is a metal plate having major surfaces oppositely disposed that are essentially planar and in parallel relationship with the nearest surface of said first anodic reactant feeder means.

7. An electrically rechargeable cell for generating electrical energy electrochemically comprising a closeable cell housing which when closed forms an internal compartment and has oppositely disposed, electronically-conductive, wall surfaces which are electronically insulated from each other and serve as the anode and cathode of said cell, an electronically-insulative, cationically-conductive, solid electrolyte interposed between said anode and said cathode dividing said compartment into an anodic reaction zone extending between said solid electrolyte and said anode and a cathodic reaction zone extending between said solid electrolyte and said cathode and separating the anodic half-cell reactions of said anodic reaction zone from the cathodic half-cell reactions of said cathodic reaction zone, anodic reactant feed means comprising a porous object, positioned within said anodic reaction zone, and in contact with said solid electrolyte, a first cathodic reactant feeder means positioned within said cthodic reaction zone in contact with said solid electrolyte and comprising a porous object having a first average pore diameter, a second cathodic reactant feeder means positioned within said cathodic reaction zone in contact with said first cathodic reactant feeder means and comprising a porous object having a second average pore diameter, said second average pore diameter being substantially larger than said first average pore diameter, an alkali metal within said anodic reaction zone, in contact with said anodic reactant feeder means and said solid electrolyte and in electrical connection with said anode, and within said cathodic reaction zone in contact with said first cathodic reactant feeder means, said second cathodic reactant feeder means, and said solid electrolyte, and in electrical connection with said cathode, a sulfur-comprising cathodic reactant-electrolyte that is electrochemically reversibly reactive with ions of said alkali metal, said solid electrolyte being selectively conductive to ions of said alkali metal and essentially impermeable to all other contents of said anodic reaction zone and said cathodic reaction zone.

8. A cell in accordance with claim 7 wherein said first cathodic reactant feeder means is electronically conductive and has a substantial number of pores in the capillary range.

9. A cell in accordance with claim 7 wherein said first cathodic reactant feeder means is electronically conductive and has an average pore diameter of about 20 to about 30 microns.

10. A cell in accordance with claim 7 wherein said first cathodic reactant feeder means is a porous carbon plate having major surfaces oppositely disposed that are essentially planar and in parallel relationship with the nearest surface of said solid electrolyte.

11. A cell in accordance with claim 7 wherein said second cathodic reactant feeder means is electronically conductive and has an average pore diameter at least twice as large as said first average pore diameter.

12. A cell in accordance with claim 7 wherein said second cathodic reactant feeder means is a carbon-comprising plate having major surfaces oppositely disposed that are essentially planar and in parallel relationship with the nearest surface of said first cathodic reactant feeder means.

13. An electrically rechargeable cell for generating electrical energy electrochemically comprising a closeable cell housing which when closed forms an internal compartment and has oppositely disposed, electronically-conductive, wall surfaces which are electronically insulated from each other and serve as the anode and cathode of said cell, an electronically-insulative, cationically-conductive, solid electrolyte interposed between said anode and said cathode dividing said compartment into an anodic reaction zone extending between said solid electrolyte and said cathode and separating the anodic half-cell reactions of said anodic reaction zone from the cathodic half-cell reactions of said cathodic reaction zone, anodic reactant feeder means comprising a porous object positioned within said anodic reaction zone and in contact with said solid electrolyte, a cathodic reactant feeder means comprising a porous object positioned within said cathodic reaction zone and in contact with said solid electrolyte, an alkali metal within said anodic reaction zone, in contact with said anodic reactant feeder means and said solid electrolyte, and in electrical connection with said anode, and within said cathodic reaction zone in contact with said cathodic reactant feeder means and said solid electrolyte and in electrical connection with said cathode, a sulfur-comprising cathodic reactant-electrolyte that is electrochemically reversibly reactive with ions of said alkali metal, said solid electrolyte being selectively conductive to ions of said alkali metal and essentially impermeable to all other contents of said anodic reaction zone and said cathodic reaction zone.

14. A cell in accordance with claim 13 wherein said anode, said cathode, said solid electrolyte, said anodic reactant feed means, and said cathodic reactant feeder means each have oppositely disposed, essentially planar surfaces and are arranged in parallel relationship with each other.

15. A cell in accordance with claim 13 wherein said anodic reactant feeder means comprises an electronically conductive porous plate.

16. A cell in accordance with claim 13 wherein said anodic reactant feeder means comprises a porous metal plate with the average pore diameter therein being in the capillary range.

17. A cell in accordance with claim 13 wherein said cathodic reactant feeder means comprises an electronically conductive porous plate.

18. A cell in accordance with claim 13 wherein said cathodic reactant feeder means comprises a porous carbon plate with the average pore diameter therein being in the capillary range.

19. A cell in accordance with claim 13 wherein a resilient electron conductor is positioned between and in electrical connection with said anode and said anodic reactant feeder means.

20. A cell in accordance with claim 13 wherein a resilient electron conductor is positioned between and in electrical connection with said cathode and said cathodic reactant feeder means.

21. A cell in accordance with claim 13 wherein said alkali metal is molten sodium.

22. An electrically rechargeable battery of cells wherein electrical energy is generated electrochemically comprising in combination (1) cell retainer means constructed and arranged to retain a plurality of electrically rechargeable cells in a row and in series electrical connection, (2) a row of electrically rechargeable cells in series electrical connection within said cell retainer means, each of said cells comprising a closeable cell housing which when closed forms an internal compartment and has oppositely disposed, electronically-conductive, wall surfaces which are electronically insulated from each other and serve as the anode and cathode of said cell, an electronically-insulative, cationically-conductive, solid electrolyte interposed between said anode and said cathode dividing said compartment into an anodic reaction zone extending between said solid electrolyte and said cathode and separating the anodic half-cell reactions of said anodic reaction zone from the cathodic half-cell reactions of said cathodic reaction zone, anodic reactant feeder means comprising a porous object positioned within said anodic reaction zone and in contact with said solid electrolyte, a cathodic reactant feeder means comprising a porous object positioned within said cathodic reaction zone and in contact with said solid electrolyte, an alkali metal within said anodic reaction zone, in contact with said anodic reactant feeder means and said solid electrolyte, and in electrical connection with said anode, and within said cathodic reaction zone in contact with said cathodic reactant feeder means and said solid electrolyte and in electrical connection with said cathode, a sulfur-comprising cathodic reactant-electrolyte that is electrochemically reversibly reactive with ions of said alkali metal, said solid electrolyte being selectively conductive to ions of said alkali metal and essentially impermeable to all other contents of said anodic reaction zone and said cathodic reaction zone, said series electrical connection being established solely by direct contact between cell housings of adjacent cells, (3) a first electrical conductor in electrical connection with the anode of a first terminal cell of said row, and (4) a second electrical conductor in electrical connection with the cathode of the second terminal cell of said row.

23. An electrically rechargeable battery of cells in accordance with claim 22 wherein the anodic reaction zone of a first cell and the cathodic reaction zone of an adjacent cell are separated by a single metal sheet.

References Cited

UNITED STATES PATENTS

| | | |
|---|---|---|
| 3,404,035 | 10/1968 | Kummer et al. |
| 3,408,229 | 10/1968 | Posey et al. |
| 3,413,150 | 11/1968 | Kummer et al. |

WINSTON A. DOUGLAS, Primary Examiner

A. SKAPARS, Assistant Examiner

U.S. Cl. X.R.

136—83, 153